United States Patent [19]

Moraw et al.

[11] 4,132,893

[45] Jan. 2, 1979

[54] METHOD AND APPARATUS FOR RECORDING AND OPTICALLY REPRODUCING X-RAY IMAGES

[75] Inventors: Roland Moraw; Günther Schädlich, Naurod, Germany

[73] Assignee: Hoechst Aktiengesellschaft, Frankfurt, Fed. Rep. of Germany

[21] Appl. No.: 796,537

[22] Filed: May 13, 1977

[30] Foreign Application Priority Data

May 15, 1976 [DE] Fed. Rep. of Germany ....... 2621715

[51] Int. Cl.[2] ............ G03B 41/16

[52] U.S. Cl. ............ 250/315 A

[58] Field of Search ............ 250/315, 315 A

[56] References Cited

U.S. PATENT DOCUMENTS 4,002,906 1/1977 Pekau et al. ............ 250/315 A

*Primary Examiner*—Alfred E. Smith

*Assistant Examiner*—T. N. Grigsby

*Attorney, Agent, or Firm*—Bacon & Thomas

[57] ABSTRACT

Disclosed are a method for serially recording and optically reproducing X-ray images on a recording material and an apparatus for carrying out the method. The method comprises the steps of disposing the recording material in an ionization chamber filled with a gas which is ionizable by X-rays; applying a high voltage across the ionization chamber; passing the X-rays to be recorded into the ionization chamber; heating the recording material until a deformation image is formed according to the charge distribution produced during irradiation due to the ionization of the gas; optionally cooling and fixing of the deformation image; optically reproducing, the deformation image; re-heating the recording material in the ionization chamber until the deformation image is erased by smoothing; optionally cooling the recording material and repeating the entire recording cycle.

18 Claims, 4 Drawing Figures

METHOD AND APPARATUS FOR RECORDING AND OPTICALLY REPRODUCING X-RAY IMAGES

BACKGROUND OF THE INVENTION

The present invention relates to a method and apparatus for recording and optically reproducing X-ray images on a recording material, and more particularly, to such a method and apparatus wherein the recording material is disposed in an ionization chamber filled with a gas which is ionizable by X-rays, a high voltage is applied to electrodes in the ionization chamber, the X-rays to be recorded are passed into the ionization chamber, the recording material is heated until a deformation image is formed according to the charge distribution produced during irradiation due to the ionization of the gas, and the deformation image is cooled and fixed.

X-ray images are, to a large extent, recorded on photographic X-ray films and plates, in which a photoconducting layer, preferably a selenium layer charged prior to exposure, is partially discharged by X-rays, and the remaining charge image is made visible by means of a toner. Selenium layers, however, have a relatively poor sensitivity to X-rays.

A known recording technique (German Pat. No. 1,497,093) uses photoelectrons which are produced in a photocathode which is sensitive to X-rays, e.g., made of lead. In an electric field within a chamber filled with an ionizable gas these photoelectrons are accelerated toward a dielectric film sheet. For developing the charge image on the film sheet by means of a toner, the ionization chamber is opened and the film sheet is removed. The sensitivity to X-rays is increased when the absorption of the X-ray quanta takes place in an ionizable gas, such as xenon, under positive pressure, instead of in the lead cathode. In practice, opening of the ionization chamber is unfavorable, since it always involves losses of gas and time. In order to prevent such losses, it is known from German Offenlegungsschrift No. 2,433,766 to transfer charge patterns through an insulating plate having inserted conducting pins to a dielectric charge carrier material outside the chamber. In this method, however, the quality of the image is impaired on account of a charge equalization between the closely spaced pins and also due to a capacitive interaction between the pins. In addition, special measures must be taken to ease the pressure acting on the pin plate which is sensitive to mechanical stresses.

In accordance with another known method (U.S. Pat. No. 3,842,801) the charge pattern produced on the dielectric sheet is developed with a toner powder, while the sheet is still in the ionization chamber. Thus, the access time is reduced, but the ionization chamber may easily get soiled and it must still be opened after each recording.

In the process disclosed in German Offenlegungsschrift No. 2,436,894, a thermoplastic recording layer is placed on a transparent electrode in an ionization chamber and is irradiated by X-rays. A high voltage is applied to the electrodes of the ionization chamber, which is filled with xenon under positive pressure, and subsequently X-rays are passed into the partly transparent chamber. Thus, a charge image is produced on the thermoplastic surface. The thermoplastic material is then heated until a deformation image is formed and is cooled down again to fix the image. Using a schlieren optical system positioned behind the chamber, the deformation image is shown on a screen. Thermal developing of the deformation image without a developer substance is a clean procedure which is accomplished in only a few seconds, so that X-ray images may be rapidly recorded and reproduced. A cyclic operation, in which several successive recordings are made and the respective deformation images are erased without having to open the chamber after each fixing of the deformation image is, however, not provided for in this process.

SUMMARY OF THE INVENTION

It is the object of the present invention to provide a method for the cyclic recording and optical reproduction of X-ray images in which opening of the ionization chamber and removal of the recording material after each recording operation are no longer required.

A further object of the invention is to provide an apparatus for carrying out this improved method.

In accomplishing the foregoing objects, there has been provided in accordance with the present invention a method for recording and optically reproducing X-ray images on a recording material, comprising the steps of disposing the recording material in an ionization chamber filled with a gas which is ionizable by X-rays; applying a high voltage across the ionization chamber; passing the X-rays to be recorded into the ionization chamber; heating the recording material until a deformation image is formed according to the charge distribution produced during irradiation due to the ionization of the gas; optionally fixing of the deformation image; optically reproducing the deformation image; re-heating the recording material in the ionization chamber until the deformation image is erased by smoothing; optionally cooling the recording material, preferably to the original temperature; and repeating the entire recording cycle.

In one embodiment, the optical reproduction step comprises passing visible radiation through the recording material along the same path as the X-rays and optically projecting the visible deformation image onto a screen.

In another embodiment, the optical reproduction step comprises moving the recording material from the zone of X-ray radiation into a zone of visible radiation, there passing visible radiation through the recording material and optically projecting the visible deformation image onto a screen.

According to another embodiment of the invention the steps comprising recording the X-ray in the form of a deformation image and the step of through-radiation of the deformation image by visible radiation are effected simultaneously in one recording cycle.

According to another aspect of the invention, there has been provided an apparatus for carrying out the above-defined process comprising: a housing adapted to be filled with gas under pressure, including walls which are partly permeable to visible radiation; a first and a second electrode transparent to visible radiation, these electrodes being positioned in spaced relationship in the housing and the second electrode being adapted for supporting a thermoplastic recording material; means for applying a voltage across the electrodes; means for passing X-rays to be recorded through the housing and the electrodes; means for passing visible radiation through at least the second electrode and for optically reproducing the deformation image formed in the thermoplastic recording material; means for applying to the electrode heater voltage pulses sufficient to heat the thermoplastic recording material only enough to produce a deformation image thereon in response to the passage of the X-rays; and means for applying to the second electrode heater voltage pulses sufficient to heat the thermoplastic recording material for thermal erasure of a deformation image formed thereon. Preferably the apparatus is designed as a measuring head and further comprises an electrical supply unit having a screen, a flexible cable tube connecting the supply unit with the measuring head, the cable tube including electric cables for supplying the electrodes with a high voltage and a heating voltage and also a bundle of optically conducting fibers connected to the screen.

Further objects, features and advantages of the invention will become apparent from the detailed description of preferred embodiments which follows, when considered together with the attached figures of drawing.

DETAILED DESCRIPTION OF PREFERRED EMBODIMENTS

According to the invention, the recording material in the ionization chamber is re-heated after fixing of the deformation image until the deformation image is erased by smoothing, the recording material is then cooled and the entire recording cycle is repeated.

It is generally known that deformation images can be erased from thermoplastic material, but up to now this method has only been proposed in connection with electron beam recordings under vacuum or in connection with photoconducting thermoplastic layers exposed to light. Application of this method in an ionization chamber is a novel procedure. In practice, X-ray recording according to this method may be regarded as a real time technique, which is of particular importance in serial radiology employed in material testing as well as in medical examinations, since the instantaneous condition of the material tested or the person examined is revealed when this method is used.

In an appropriate apparatus for carrying out the method, the second electrode is equipped with terminals through which heater voltage pulses are applicable to that electrode in order to form or to thermally erase a deformation image on the recording material.

Figure 1:
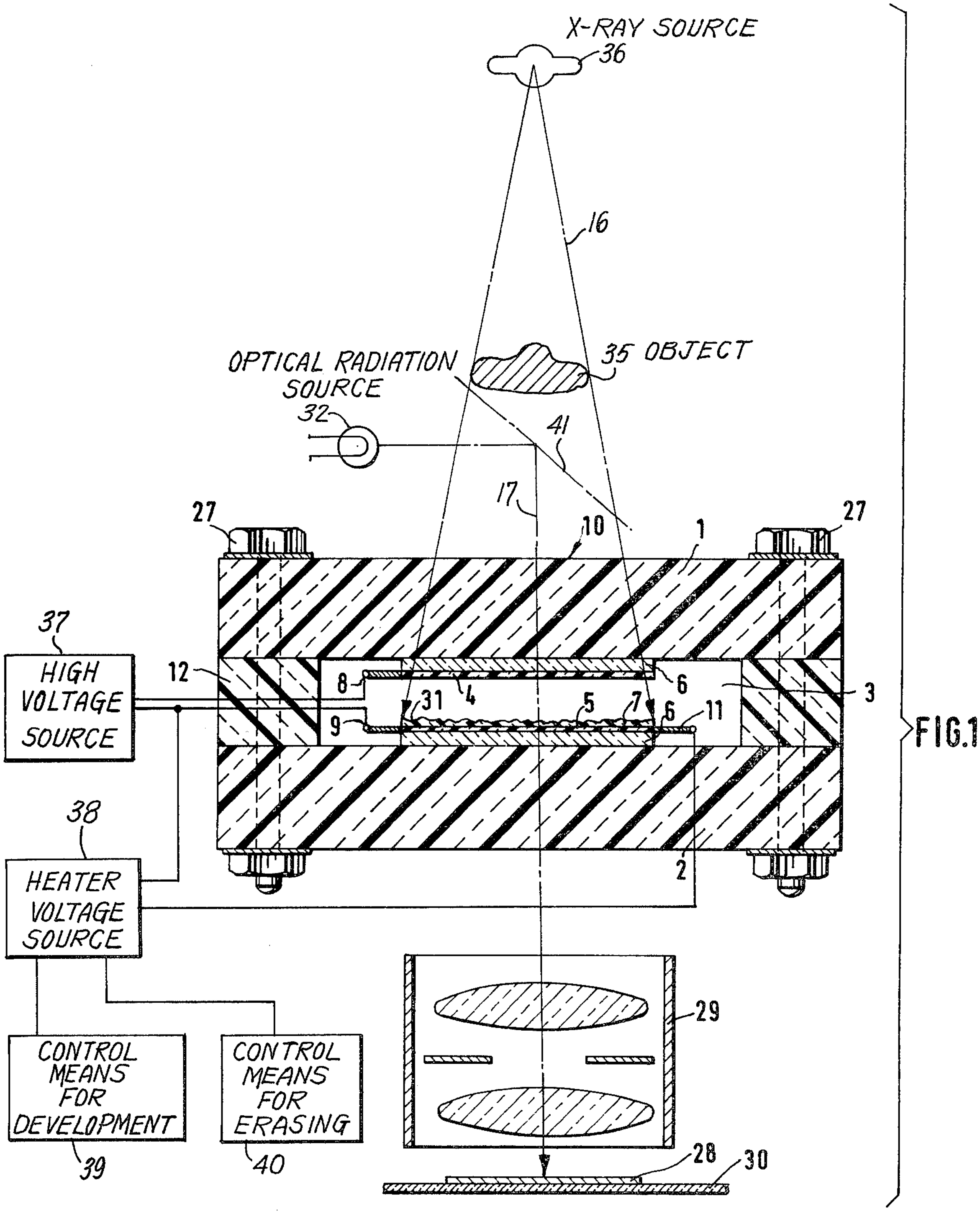
FIG. 1 is a sectional view of a diagrammatically shown ionization chamber according to the invention with stationary electrodes.

The embodiment of the ionization chamber in accordance with FIG. 1 comprises a housing 10 with a transparent cover plate 1 and a transparent bottom plate 2 which together with side walls 12 enclose an interior space 3. The interior space is filled with an ionizable heavy-atomic gas, such as xenon, under positive pressure. The gas intakes are not shown in the figure. The interior space 3 includes a stationary transparent upper electrode 4 as well as a stationary transparent lower electrode 5. The two electrodes are each applied to a glass carrier 6, which carriers may also be made of other transparent materials. A thermoplastic recording material 7 is positioned on the lower electrode 5. During irradiation from a X-ray source 36 with X-rays 16, which are modulated according to an object 35, a high voltage from a high voltage source 37 is applied between a terminal 8 of the upper electrode 4 and a terminal 9 of the lower electrode 5. Charges produced in the gas-filled interior space by X-ray absorption are accelerated in the electric field, and by secondary ionization they intensify the charge image produced on the surface of the thermoplastic recording material 7. Thermal developing is preferably effected by resistance heating of the lower electrode 5. For that purpose, a heater voltage pulse from a heater voltage source 38 is applied to the terminal 9 and to another terminal 11 of the electrode 5, which heater voltage pulse is adjusted by control means for development 39 to deform the recording layer in accordance with the charge image, without erasing the deformation image 31 formed. Said control means for development 39 and control means for erasing 40 are connected to the heater voltage source 38. Via a phase optical system 29 the deformation image 31 is shown on a screen 30 by means of transmitted light or by reflection. After the image 28 has appeared on the screen 30 for a sufficient period of time, a heater voltage pulse is again applied to the terminals 9 and 11, without opening the chamber, and this heater voltage pulse is adjusted by the control means for erasing 40 to smooth the softened recording layer under the influence of the surface tension. After the recording material has cooled down, the system is ready for another X-ray recording.

In one embodiment of the invention, the ionization chamber is made of a transparent plastic material 2 centimeters in thickness. The chamber is slightly pressurized with xenon. At a distance of 1 centimeter from each other, two transparent electrodes are applied to two 50 × 50 × 3 mm. glass plates which are each provided with a conducting transparent layer having a resistance of 20 Ohms/cm$^2$. The electrodes are composed of two electrode strips which have a width of 1 centimeter and are disposed in spaced relationship with respect to one another. The lower electrode 5 is covered with a thermoplastic layer of about 3 $\mu$m thickness of a methacrylate/styrene copolymer having a glass transition point at about 60° C. During irradiation with X-rays of 80 KV through an apertured plate made of lead, a high voltage of +7 KV acts on the electrodes 4 and 5, with the lower electrode being grounded. Upon termination of the X-ray irradiation, a heater voltage pulse of 97 volts is applied for 0.02 secs. to the terminals 9 and 11 of the electrode strips forming the electrode 5. Immediately following thermal developing, ring-like pattern corresponding to the apertured plate can be shown on the screen 30 positioned below the chamber, by means of a laser beam passing through the transparent chamber. By application of a second heater pulse of the same voltage for 0.08 secs. the relief image is erased and, following a cooling period of approximately 45 secs., recording can be repeated under identical conditions. A number of cyclical recordings can be made in this rhythm.

When the inventive method is carried out using the apparatus shown in FIG. 1, it is time-consuming to have to move the ionization chamber first in front of the X-ray source 36 and then into the zone of visible radiation 17 of an optical radiation source 32 which radiation is deflected by a mirror 41. This can be avoided by separating, within the ionization chamber, the zone of X-ray radiation 16 front the zone of visible radiation 17, as shown by the embodiments according to FIGS. 2 and 3. In order to spatially separate the zone of X-ray radiation from the zone of visible radiation, the ionization chamber is equipped with a swivelling second electrode 5. In this case, the first electrode 4 need not be transparent. The housing 10 comprises transparent side walls 12 which are fastened to the cover plate 1 and the bottom plate 2 by means of through bolts 27. The second electrode 5 has a hinge 13 and can be turned from a horizontal position, parallel with the cover plate 1, down into a vertical position, parallel with the side walls 12. Movement in the horizontal and vertical directions is limited by stops 14 and 15 attached to the insides of the housing walls.

Together with a locking bolt 26 the stop 14 fixes the second electrode in its horizontal position. The visible rays pass through the housing 10 without being obstructed by the cover plate 1, through which X-ray irradiation is effected. The deformation image 31 may be erased while the recording material 7 is either in the horizontal or in the vertical position.

Due to the different spatial positions of the recording material 7 during X-ray exposure and during optical through-radiation or reflection, the optical application of a scanning pattern or screen on the recording material 7 is facilitated. Without application of the pattern, the deformations produce image areas where the intensity of the electric field changes, e.g., at line patterns or generally at boundary lines of halftone areas, even in case of a thermoplastic layer which was homogeneously charged prior to X-ray exposure. Such gradient line images may be advantageous for solving certain particular tasks, but usually, the halftone gradations of X-ray images are used as guideline assistances. In order to be able to reproduce halftones by means of deformation images, it is necessary to apply a pattern to the thermoplastic layer. An approved screening method is the application, by exposure, of a periodic intensity pattern on a thermoplastic photoconducting recording layer. Such recording layers are, e.g., composed of copper phthalocyanine in polystyrene or of a double layer of poly-n-vinylcarbazole with an addition of trinitrofluorenone and a covering layer of methacrylate/styrene copolymers.

Figure 2:
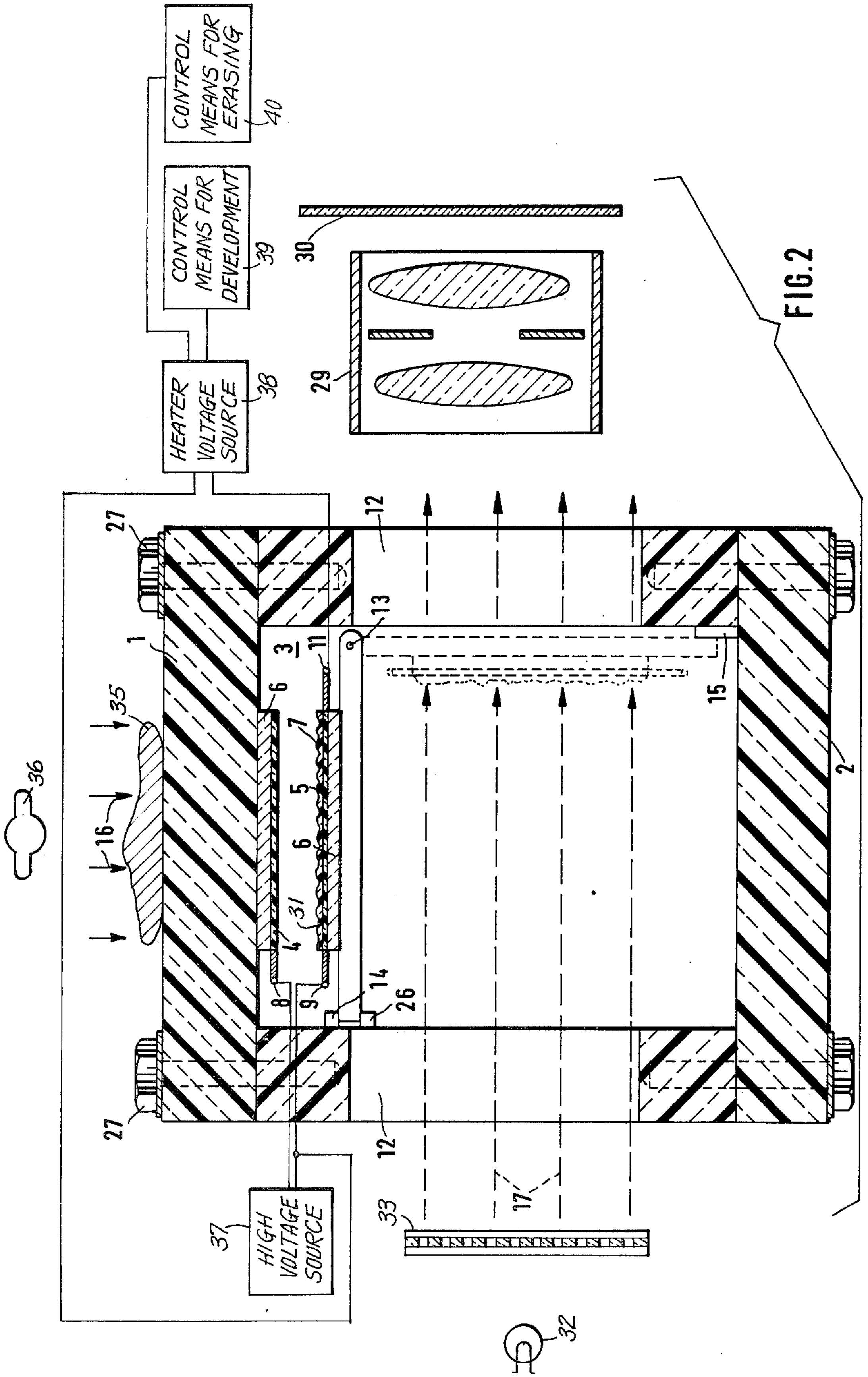
FIG. 2 is a sectional view of another embodiment of the ionization chamber comprising a swivelling electrode.
Figure 3:
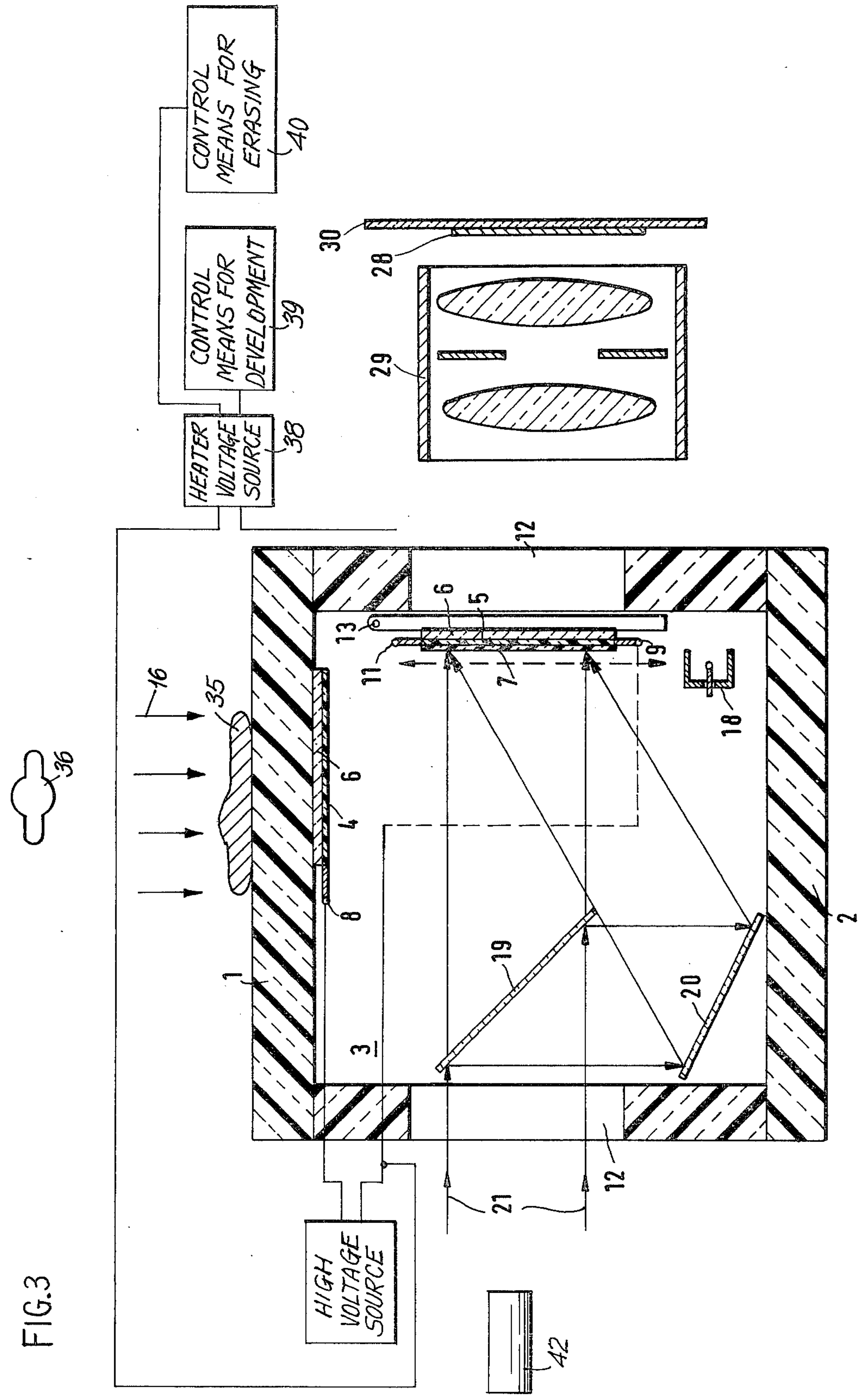
FIG. 3 shows a further embodiment of the ionization chamber, including optical elements for projecting the recorded X-ray image upon a screen.

By means of the embodiments shown in FIGS. 2 and 3 it is possible to perform an optical evaluation shortly after recording, with the examined object lying on the cover plate 1. For that purpose, the second electrode 5 carrying the recording material 7 is turned down into the zone of visible radiation 17, and thermal developing is effected prior to, during and/or after turning down of the electrode. Then the optical information obtained is evaluated, and the image is subsequently thermally erased. Prior to another X-ray recording, the recording material 7 is electrostatically charged using a corona 18 (FIG. 3). A line or grid pattern 33 is arranged in front of one of the transparent side walls 12 and this pattern is projected upon the recording material 7 by a source of radiation 32. Simultaneously, the source of radiation 32 projects the deformation image 31 upon the screen 30 positioned behind the housing 10. The source of radiation used to produce a screen pattern or an interference pattern may be a laser 42 the beam 21 of which is devided (FIG. 3) by a beam splitter 19 and reunited by way of a mirror 20. It is obvious that time is saved by using one source of radiation only for the optical evaluation of the deformation image and for the application of a screen pattern, without having to remove the examined object. The charged recording layer, to which a screen or grid pattern has been applied by pre-exposing is then turned into the horizontal position for X-ray exposure and the recording cycle is continued.

Screening by grid patterns has the advantage that it makes it relatively easy to represent the X-ray images as positive or as negative images, as required. Depending on the charges existing in the ionization chamber, which may be of the same or of opposite polarity (as in the case of corona charging), the image areas exposed to X-rays appear as dark areas and the image areas not exposed to X-rays appear as light areas when the undeflected light rays are reproduced, or the image areas exposed to X-rays appear as light areas and the image areas not exposed to X-rays appear as dark areas, when the light rays deflected at the grid pattern are reproduced. If corona charging is omitted and charges are applied to the recording material by a correspondingly intensive X-ray exposure only, the grid pattern has to be applied by exposure prior to thermal developing. Image areas exposed to X-rays are shown as dark areas by the undeflected light beam and as light areas by the deflected light beam.

Figure 4:
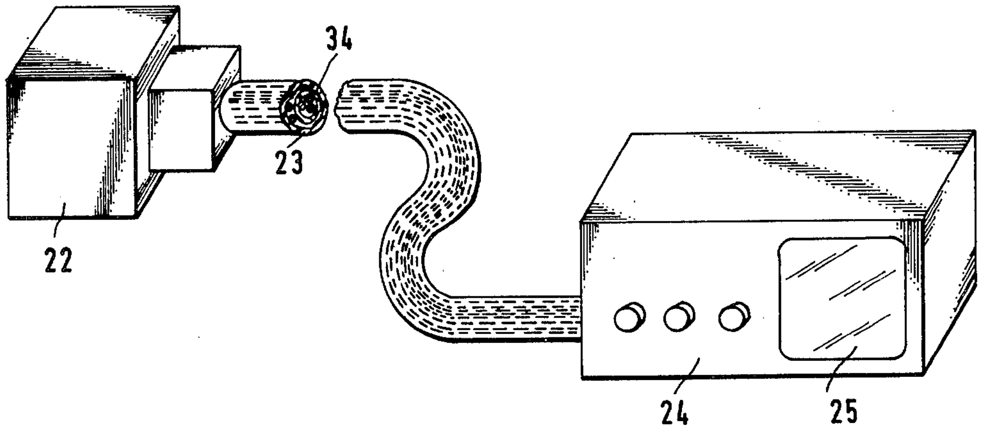
FIG. 4 is a perspective, diagrammatic view of an ionization chamber designed as a measuring head connected to an electrical supply unit via a flexible cable tube.

In order to avoid impairment of the operator's health by the influence of X-rays and in order to facilitate measurement in areas which are not easily accessible, e.g., in material testing of pipes, the ionization chamber may be designed as a measuring head 22, together with the optical accessories required. As shown in FIG. 4, the measuring head 22 is connected to a screen 25 of the electrical supply unit 24 via a flexible cable tube 23, comprising electric cables as well as a bundle of optically conducting fibers 34.

In cyclic recording with repeated thermal erasing operations carried out on the thermoplastic or photothermoplastic recording layer, it is sometimes difficult to smooth the deformation image by the influence of heat only to thereby avoid superposition of the new image on an image of the preceding recording. As an additional measure, which nearly always leads to an absolutely permanent erasing, charges of opposite polarities as compared to those of the X-ray image are applied to the recording layer prior to or during thermal erasing.

With the recording method described, deformation images which are stable up until the intended thermal erasing are obtained with a short access time. For optimum formation of deformation images a sufficient cooling time must be allowed after thermal erasing. When the cooling time is successively shortened up to the point where an erasing surge is applied to the terminals 9 and 11 at intervals of about 7 secs., the temperature produced in the recording layer results in permanent deformability of the thermoplastic layer. Simultaneous X-ray exposure and through-radiation by laser light allow recording of the X-ray image as a real time image, since a movement of the apertured plate in the X-ray zone also shifts the optical image on the screen. When X-ray exposure is interrupted, the optical image disappears after about 5 secs. This method of representation with simultaneous recording and erasing requires an automatic temperature control for resistance heating of the electrode 5.

Screening is obtained by applying, during X-ray exposure, an optical periodic intensity pattern to the photothermoplastic layer which is continuously charged by X-ray exposure.

What is claimed is:

1. A method for serially recording and optically reproducing X-ray images on a recording material, comprising the steps of disposing the recording material in an ionization chamber filled with a gas which is ionizable by X-rays; applying a high voltage across the ionization chamber; passing the X-rays to be recorded into the ionization chamber; heating the recording material until a deformation image is formed according to the charge distribution produced during irradiation due to the ionization of the gas; optically reproducing the deformation image; re-heating the recording material in the ionization chamber until the deformation image is erased by smoothing; and repeating the entire recording cycle.

2. The method in accordance with claim 1, comprising the steps of disposing the recording material in an ionization chamber filled with a gas which is ionizable by X-rays; applying a high voltage across the ionization chamber; passing the X-rays to be recorded into the ionization chamber; heating the recording material until a deformation image is formed according to the charge distribution produced during irradiation due to the ionization of the gas; fixing of the deformation image; optically reproducing the deformation image; reheating the recording material in the ionization chamber until the deformation image is erased by smoothing; cooling the recording material and repeating the entire recording cycle.

3. The method in accordance with claim 2, wherein said cooling step comprises cooling the recording material to the same temperature as prior to the first recording.

4. The method in accordance with claim 2, wherein said optical reproduction step comprises passing visible radiation through the recording material along the same path as the X-rays and optically projecting the visible deformation image onto a screen member.

5. The method in accordance with claim 2, wherein said optical reproduction step comprises moving the recording material from the zone of X-ray radiation into a zone of visible radiation, there passing visible radiation through the recording material and optically projecting the visible deformation image onto a screen member.

6. The method in accordance with claim 5, wherein following the steps of thermal erasing and cooling, the method further comprises the steps of uniformly charging the surface of the recording material by means of a corona and irradiating the recording material in the zone of visible radiation by a periodically modulated light pattern, whereby the deformation image is shown as a negative or as a positive of the X-ray image, using for representation the visible rays deflected or undeflected at the modulated light pattern.

7. The method in accordance with claim 5, wherein the periodically modulated light pattern produced on the recording material is a line pattern or a grid pattern.

8. The method in accordance with claim 7, wherein a common source of light is used for applying by exposure the line or grid pattern and for projecting the deformation image.

9. The method in accordance with claim 1, wherein said steps comprising recording the X-ray in the form of a deformation image and the step of through-radiation of the deformation image by visible radiation are effected simultaneously in one recording cycle.

10. The method in accordance with claim 5, wherein the visible radiation, after having passed the deformation image, is projected on the screen via a bundle of optically conducting fibers.

11. The method in accordance with claim 2, further comprising the step of charging the recording layer prior to or during thermal erasing with charges of opposite polarities compared to the charges of said high voltage used for recording.

12. An apparatus for serially recording and optically reproducing X-ray images on a recording material, comprising:

a housing adapted to be filled with gas under pressure, including walls which are partly permeable to visible radiation;

a first and a second electrode at least the latter being transparent to visible radiation, said electrodes being positioned in spaced relationship in said housing and said second electrode being adapted for supporting a thermoplastic recording material;

means for applying a voltage across said electrodes;

means for passing X-rays to be recorded through said housing and said electrodes;

means for passing visible radiation through at least said second electrode and for optically reproducing the deformation image formed in the thermoplastic recording material;

means for applying to said electrode heater voltage pulses sufficient to heat the thermoplastic recording material only enough to produce a deformation image thereon in response to the passage of said X-rays; and means for applying to said second electrode heater voltage pulses sufficient to heat the thermoplastic recording material for thermal erasure of a deformation image formed thereon.

13. The apparatus in accordance with claim 12, wherein said X-ray passing means and said visible light passing means are positioned to provide within said housing a zone for visible radiation as well as a zone for X-rays, which zones are spatially separated from each other.

14. The apparatus in accordance with claim 13, further comprising means for swivelling the second electrode from the zone of X-rays into the zone of visible radiation.

15. The apparatus in accordance with claim 14, further comprising means, including stops fastened in the horizontal and vertical direction on the insides of the housing walls for limiting the swivelling movement of the second electrode and means, including a locking bolt, for fixing the second electrode in a horizontal position.

16. The apparatus in accordance with claim 15, further comprising a line or grid pattern disposed in front of one of the transparent housing walls in a position so that it is projected upon the recording material by said visible light passing means.

17. The apparatus in accordance with claim 16, wherein said visible light passing means includes a laser, a beam splitter positioned in front of the laser, and a mirror arranged inside the housing for reuniting the split laser beam.

18. The apparatus in accordance with claim 17, wherein the apparatus is designed as a measuring head, and which further comprises an electrical supply unit having a screen, a flexible cable tube connecting the supply unit with the measuring head, said cable tube including electric cables for supplying the electrodes with a high voltage and a heating voltage and also a bundle of optically conducting fibers connected to the screen.

* * * * *